US008177179B2

(12) United States Patent
Bard et al.

(10) Patent No.: US 8,177,179 B2
(45) Date of Patent: May 15, 2012

(54) LOCKING SENSOR

(75) Inventors: Oliver Bard, Falkensee (DE); Wolfgang Grundmann, Birkenwerder (DE)

(73) Assignee: EPCOS AG, Munich (DE)

( * ) Notice: Subject to any disclaimer, the term of this patent is extended or adjusted under 35 U.S.C. 154(b) by 242 days.

(21) Appl. No.: 12/273,034

(22) Filed: Nov. 18, 2008

(65) Prior Publication Data

US 2009/0133449 A1 May 28, 2009

Related U.S. Application Data

(63) Continuation of application No. PCT/DE2007/000766, filed on Apr. 27, 2007.

(30) Foreign Application Priority Data

May 18, 2006 (DE) .......................... 10 2006 023 438

(51) Int. Cl.
*A47B 96/00* (2006.01)
*A47G 1/10* (2006.01)

(52) U.S. Cl. .......... 248/222.12; 248/229.26; 248/316.7; 24/457

(58) Field of Classification Search .............. 248/309.1, 248/222.12, 314, 592, 316.1–316.3, 316.7, 248/300, 229.16, 229.26, 14, 231.81, 74.2, 248/733; 174/52.1; 73/866.5; 24/289, 295, 24/297, 336, 455, 457, 458; 403/326, 329; 285/305, 317, 319, 921; 374/148
See application file for complete search history.

(56) References Cited

U.S. PATENT DOCUMENTS

| 4,763,132 | A   | * | 8/1988  | Juds et al. .................... 343/890 |
| 4,840,523 | A   | * | 6/1989  | Oshida ............................ 411/48 |
| 6,386,496 | B1  | * | 5/2002  | Lai et al. .................... 248/309.1 |
| 6,406,236 | B1  | * | 6/2002  | Olson, Jr. ........................ 411/61 |
| 6,729,210 | B2  | * | 5/2004  | Morris ......................... 81/124.2 |
| 7,086,125 | B2  | * | 8/2006  | Slobodecki et al. ............ 24/295 |
| 7,213,304 | B2  | * | 5/2007  | Lubera et al. ................... 24/295 |
| 7,435,092 | B2  | * | 10/2008 | Grant ............................. 439/34 |
| 2004/0211875 | A1 |   | 10/2004 | Wisniewski et al. |
| 2005/0029416 | A1 | * | 2/2005  | Buck et al. .................... 248/200 |
| 2005/0230581 | A1 | * | 10/2005 | Gau ........................... 248/229.1 |

FOREIGN PATENT DOCUMENTS

| DE | 7018568 U       | 9/1970  |
| DE | 8232239 U1      | 5/1983  |
| DE | 103 10 454 B4   | 12/2004 |
| DE | 10 2005 044 373 A1 | 4/2006 |
| DE | 10 2005 003 293 A1 | 7/2006 |
| EP | 0 727 850 A2    | 8/1996  |

* cited by examiner

*Primary Examiner* — Tan Le
(74) *Attorney, Agent, or Firm* — Slater & Matsil, L.L.P.

(57) ABSTRACT

A locking sensor for locking into the recess of a housing with a sensor body, of locking elements, that are arranged on the sensor body and that extend in the direction of a lengthwise axis over a length. The locking elements have steps and at least two steps are spaced apart from each other in the direction of the lengthwise axis.

20 Claims, 2 Drawing Sheets

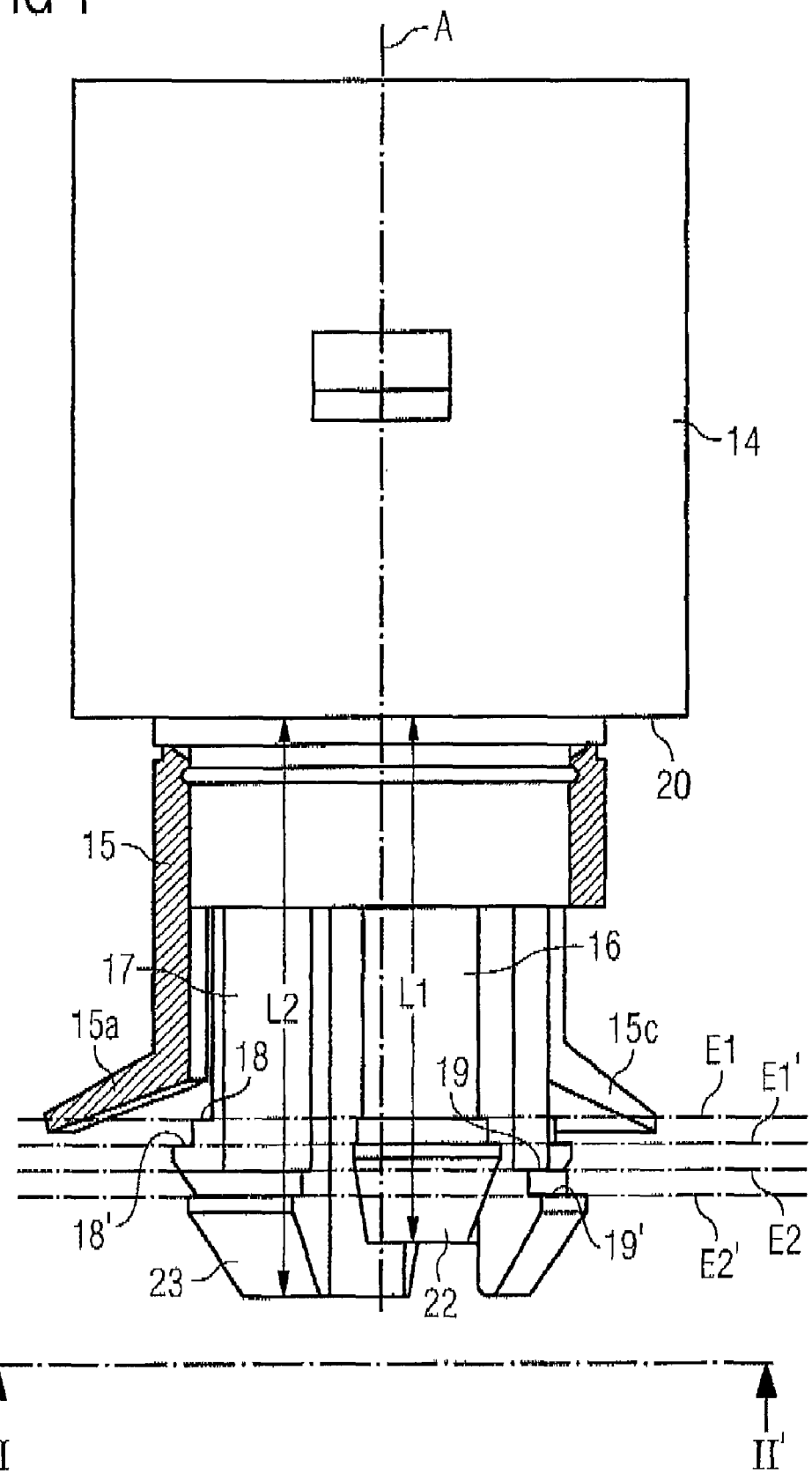

FIG 2 II-II'
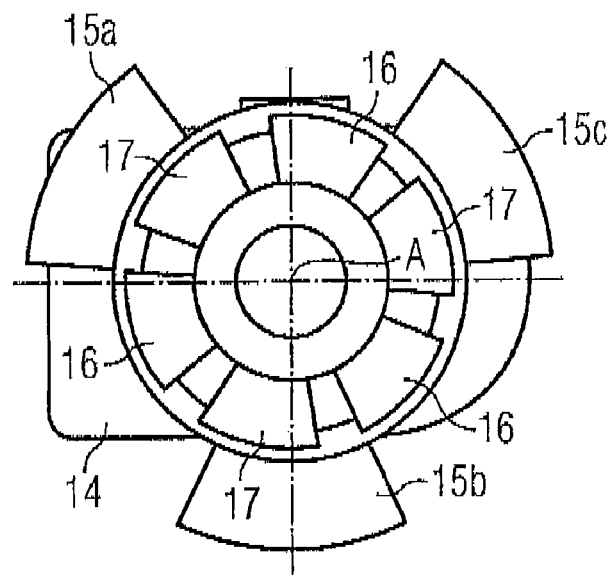
FIG 3a
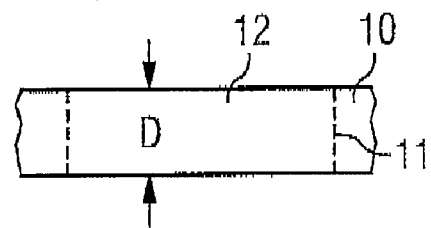
FIG 3b
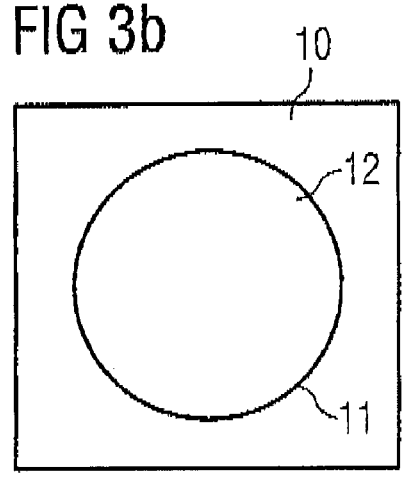

LOCKING SENSOR

This application is a continuation of co-pending International Application No. PCT/DE2007/000766, filed Apr. 27, 2007, which designated the United States and was not published in English, and which claims priority to German Application No. 10 2006 023 438.3 filed May 18, 2006, both of which applications are incorporated herein by reference.

TECHNICAL FIELD

The invention concerns a locking sensor for locking into a recess in a housing.

BACKGROUND

There are sensors in which locking arms are arranged at the side or at one end of the sensor. By means of the locking arms and possibly other suitable latching devices, such sensors are inserted into the recess of a housing and locked in place there. The locking arms thus serve to reliably secure the sensor in the housing. Such sensors are designed as temperature sensors, for example. Temperature sensors have a temperature-sensitive sensing element at one end of the sensor body, while at the other end of the sensor body there is an electrical contact device, by means of which electrical conductors extending outward from the sensor are electrically connected to the sensing element. Such temperature sensors can be used, for example, as outside temperature sensors, as room temperature sensors for heating, ventilation and air-conditioning technology in stationary systems (buildings) or in mobile systems, like vehicles.

SUMMARY

Since the housings into which such locking sensors are to be inserted frequently have quite different wall thicknesses but securing the sensor in the recess of the housing should be reliable and free of play, embodiments of the invention create a locking sensor for locking into the recess of a housing that compensates for large differences in the wall thicknesses of the housings into which the sensor is locked and can also be produced simply and cheaply.

Embodiments of the invention provide a locking sensor for locking into the recess of a housing. A sensor body and locking elements that are arranged on the sensor body and that extend over a length in the direction of a lengthwise axis, where the locking elements have steps, and at least two steps in the direction of the lengthwise axis are arranged at a distance from each other.

The locking elements are inserted through the recess in the housing, through which the locking sensor is locked in the housing. The steps, which are arranged at a distance from each other in the direction of the lengthwise axis, which forms the direction in which the locking elements extend, allow differences in the thickness of the walls of the housing in which the sensor is inserted and in which it is to be latched to be compensated. Depending on the number of steps and their distances from each other it is possible to compensate differences in the wall thicknesses of different housings.

It is advantageous if at least two of the locking elements have different lengths. It is especially advantageous if each locking element has at least one step. By making the locking elements different lengths, with each one having at least one step, it is possible to compensate for even large differences in the wall thicknesses of the housing in a simple way as a function of the length of the locking elements.

In another advantageous embodiment of the invention at least one of the locking elements has at least two steps, which are spaced apart from each other in the direction of the lengthwise axis. This is particularly advantageous since in this way considerable differences in the wall thicknesses of housings can be compensated with only a small number of such locking elements.

Moreover, it is advantageous if at least two of the locking elements have the same length. The minimum of two locking elements of the same length enables the sensor to be well supported in the wall of the housing at least two points, and with that it can be stably disposed in it.

It is especially advantageous if two of the locking elements lie opposite to each other with respect to the lengthwise axis. Particularly stable securing of the locking sensor in the wall of the housing is possible with such a symmetric arrangement of the locking elements with respect to the lengthwise axis.

It is particularly advantageous if three of the locking elements are separated by an angle of 120 degrees each, about the lengthwise axis. An especially stable latching of the sensor in the wall of the housing can be achieved in such a sensor with a centrally symmetric arrangement of the locking elements.

Moreover, it is preferable if the sensor has at least two groups of locking elements and each of the locking elements in the first group has a step where the steps of the locking elements of the first group each lie in a first plane, and each of the locking elements in the second group has a step, where the steps of the locking elements in the second group each lie in a second plane, and the first plane is spaced from the second plane in the direction of the lengthwise axis.

It is especially advantageous if the number of locking elements of the first group is equal to the number of locking elements of the second group, the locking elements of the first group are spaced from each other at the same angle, with respect to the lengthwise axis, and the locking elements of the second group are spaced from each other at the same angle with respect to the lengthwise axis. With this, it is possible to form two groups of locking elements that are each symmetrically arranged in planes. The steps of the first plane form the first locking plane, while the steps of the second plane form the second locking plane for the sensor. With that, stable latching of the sensor in the wall of the housing can be achieved both in the first plane and in the second plane.

In another additionally preferred embodiment of the invention the locking elements in the first group and the locking elements in the second group are spaced at equal angles from each other with respect to the lengthwise axis. With that, the formation of a highly symmetrical association of locking elements in the first and/or second planes can be achieved. With that, an especially stable latching of the sensor in the wall of the housing can be achieved without the latching elements mutually interfering with the different planes.

Moreover, the sensor can have at least one spring element that is elastically deformable under an axial force and that partially goes around the outside of the locking elements. In this way, sensors can be reliably latched between one of the steps of a locking element and the spring element in housings of various wall thicknesses.

The locking element can preferably be made wedge-shaped on an end segment turned away from the sensor body. With that a simple and reliable insertion of the locking element into the recess of the housing is possible.

Advantageous embodiments of the invention are explained below in more detail by means of the schematic drawings.

BRIEF DESCRIPTION OF THE DRAWINGS

FIG. 1 shows a perspective view of a locking sensor for locking in a recess of a housing;

FIG. 2 shows a view of the sensor in FIG. 1 in the direction II-II' in FIG. 1; and FIGS. 3a and 3b show a side view and a top view of a segment of the housing with the recess in which the locking sensor is inserted.

Elements of like construction or function are indicated by the same numbers in all of the figures.

DETAILED DESCRIPTION

The locking sensor shown in FIG. 1 is intended for locking into a recess 12, which has an edge 11, in a housing 10 (FIGS. 3a, 3b). The sensor has a sensor body 14 with a base section 20, on which a spring element 15 and locking elements 16 and 17 are arranged. These elements extend in the direction of lengthwise axis A. The locking elements 16 of a first group extend in the direction of the lengthwise axis A over a length L1, while the locking elements 17 of the second group extend in the direction of a lengthwise axis A over a length L2. The locking elements 16 have an end segment 22 that is turned away from the sensor body 14, while the locking elements 17 have an end segment 23 that is turned away from the sensor body 14. The end segments 22 and 23 have a bevel through which the end segments 22 and 23 are made wedge-shaped. With that, the locking elements 16 and 17 can be inserted into the recess 12 of housing 10 particularly easily.

The locking elements 16 and 17 have steps 18, 18' and 19, 19', and in this case each of the locking elements 16 and 17 is made with two steps. The locking elements 16 and 17 form two groups, where each of the locking elements 16 that belong to the first group has two steps 18 and 18'. The steps 18 of locking element 16 of the first group lie in a first plane E1, while the steps 18' of the locking elements 16 of the first group lie in another first plane, E1'. The steps 19 of the locking elements 17 of the second group lie in a second plane E2, while the steps 19' of the locking elements 17 of the second group lie in another second plane E2'. The first planes E1 and E1' and the second planes E2 and E2' are separated from each other in the direction of the lengthwise axis A, so that there are formed a total of four planes E1, E1', E2, and E2', in which locking of the sensor in the housing 10 can take place.

As can be seen in FIG. 2, the three locking elements 16 of the first group are arranged in the embodiment example shown here so that they are separated from each other by equal angles, with respect to the lengthwise axis A and the three locking elements 17 of the second group are arranged so that they are separated from each other by equal angles with respect to the lengthwise axis A. This angular separation is 120 degrees in each case for the two groups. Here the three locking elements 17 of the second group lie in the gaps that the three locking elements 16 of the first group form. Since the locking elements 16 of the first group or the locking elements 17 of the second group, moreover, have an equal spacing in the radial direction around lengthwise axis A, this results in an especially stable, centrally symmetric arrangement of the locking elements 16 and 17, which enables a particularly stable connection between the locking sensor and the housing 10.

As can be seen in FIG. 2, the spring element 15 has three spring element tongues extending in the radial direction with respect to lengthwise axis A, these are 15a, 15b and 15c with equal radial spacing, which are arranged from each other at angles of 120 degrees with respect to lengthwise axis A. This arrangement enables the sensor to be reliably secured in a recess 12 in housing 10 by the interaction of the spring element 15 with the relevant steps 18, 18', 19 and 19' of locking elements 16 and 17.

The insertion of the locking sensor into the housing 10 and its function are explained briefly below:

When the sensor is inserted into the recess 12 of housing 10, the locking elements 16 and 17 are pushed into recess 12 in the direction of lengthwise axis A. The end sections 22 and 23 of the locking elements 16 and 17 at the beginning of the insertion operation lie against the edge 11 of recess 12 before they are moved radially inwardly by the wedge-shaped design of the end sections 22 and 23 of the locking arms 16 and 17 in the direction toward lengthwise axis A, until the locking elements 16 and 17 have been inserted into recess 12 far enough that steps 19' of plane E2' elastically spring back radially outward over edge 11. During the insertion of the locking elements 16 and 17 in the direction of lengthwise axis A into recess 12, the spring element tongues 15a, 15b, and 15c are also deformed in the direction of lengthwise axis A. If the wall of the housing 10 has a thickness D as shown in FIG. 3a, the sensor can be inserted no further into recess 12 and steps 19' of plane E2', in combination with spring elements tongues 15a, 15b, and 15c, bring about a latching of the locking sensor in housing 10.

If the thickness D of the wall of housing 10 is less than shown in FIG. 3a, the locking sensor can be pushed further into the recess 12 of housing 10. If the thickness D of the wall of the housing 10 is, for example, half the thickness D of the wall in FIG. 3a, the locking sensor can be pushed into recess 12 until the edge 11 can interact with steps 18' of plane E1' of the locking elements 16. Through the interaction of steps 18' of plane E1' of locking element 16 with the spring element tongues 15a, 15b, and 15c a reliable latching of the sensor in housing 10 is achieved.

If the thickness D of the wall of the housing 10 is even smaller, for example, a tenth of the thickness D of the wall of the housing 10 in FIG. 3a, the locking elements 16 and 17 can be pushed still further into recess 12 of housing 10 until the edge 11 can interact with the steps 18 of plane E1 of locking elements 16, so that the steps 18 of plane E1 of locking elements 16 and the spring element tongues 15a, 15b, and 15c together enable secure latching of the sensor in housing 10.

What is claimed is:

1. A locking sensor for locking into a recess of a housing, the sensor comprising:
    a sensor body,
    locking elements arranged on the sensor body, the locking elements extending in the direction of a lengthwise axis over a length, wherein the locking elements have steps and at least two steps are arranged with a spacing from each other in the direction of the lengthwise axis, wherein at least two of the locking elements have different lengths and wherein at least two of the locking elements have the same length, and
    a spring element arranged on the sensor body at a distance from the steps of the locking elements, the spring element being elastically deformable in the direction of the lengthwise axis, wherein the spring element is located at a distance from the steps of the locking elements to enable the sensor to be secured to a recess in a housing by an interaction of the spring element with the steps of locking elements.

2. The sensor of claim 1, wherein each locking element has at least one step.

3. The sensor of claim 1, wherein at least one of the locking elements has at least two steps that are spaced apart from each other in the direction of lengthwise axis.

4. The sensor of claim 1, wherein two of the locking elements lie opposite each other with respect to the lengthwise axis.

5. The sensor of claim 1, wherein the locking elements comprise three locking elements having an angular spacing from each other of 120 degrees each, with respect to the lengthwise axis.

6. The sensor of claim 1, wherein the sensor has at least two groups of locking elements and each locking element belonging to a first group has a step, wherein the steps of the locking elements of the first group each lie in a first plane and each of the locking elements belonging to a second group has a step, wherein the steps of the locking elements of the second group each lie in a second plane, and wherein the first planes are separated from the second planes in the direction of the lengthwise axis.

7. The sensor of claim 6, wherein the number of locking elements of the first group is equal to the number of locking elements of the second group, the locking elements of the first group having a same angular spacing from each other, with respect to the lengthwise axis and the locking elements of the second group having a same angular spacing from each other, with respect to the lengthwise axis.

8. The sensor of claim 6, wherein the locking elements of the first group and the locking elements of the second group have the same angular spacings from each other, with respect to the lengthwise axis.

9. The sensor of claim 1, wherein the locking elements are made wedge-shaped at an end section that is turned away from the sensor body.

10. The sensor of claim 1, wherein the locking elements comprises first, second, third and fourth locking elements, wherein the first and second locking elements have a first length and wherein the third and fourth locking elements have a second length that is different than the first length.

11. The sensor of claim 10, wherein the first locking element has an angular spacing of 120 degrees from the second locking element with respect to the lengthwise axis and wherein the third locking element has an angular spacing of 120 degrees from the fourth locking element with respect to the lengthwise axis.

12. The sensor of claim 11, wherein the locking elements further comprise a fifth locking element of the first length and a sixth locking element of the second length, wherein the fifth locking element has an angular spacing of 120 degrees from the first and the second locking elements with respect to the lengthwise axis and wherein the sixth locking element has an angular spacing of 120 degrees from the third and the fourth locking elements with respect to the lengthwise axis.

13. The sensor of claim 12, wherein the locking elements comprise exactly six locking elements.

14. A sensor for locking into a recess of a housing, the sensor comprising:
a sensor body,
locking elements arranged on the sensor body, the locking elements extending in the direction of a lengthwise axis over a length, wherein the locking elements have steps and at least two steps are arranged with a spacing from each other in the direction of the lengthwise axis, wherein at least two of the locking elements have the same length, and
a spring element arranged on the sensor body at a distance from the steps of the locking elements, the spring element being elastically deformable in the direction of the lengthwise axis, wherein the spring element is located at a distance from the steps of the locking elements to enable the sensor to be secured to a recess in a housing by an interaction of the spring element with the steps of locking elements.

15. The sensor of claim 1, wherein the spring element includes spring element tongues formed on the spring element, the spring element tongues extending in the radial direction with respect to the lengthwise axis.

16. The sensor of claim 13, wherein the locking elements comprise three locking elements having an angular spacing from each other of 120 degrees each, with respect to the lengthwise axis.

17. The sensor of claim 13, wherein the sensor has at least two groups of locking elements and each locking element belonging to a first group has a step, wherein the steps of the locking elements of the first group each lie in a first plane and each of the locking elements belonging to a second group has a step, wherein the steps of the locking elements of the second group each lie in a second plane, and wherein the first planes are separated from the second planes in the direction of the lengthwise axis.

18. The sensor of claim 17, wherein the number of locking elements of the first group is equal to the number of locking elements of the second group, the locking elements of the first group having a same angular spacing from each other, with respect to the lengthwise axis and the locking elements of the second group having a same angular spacing from each other, with respect to the lengthwise axis.

19. The sensor of claim 17, wherein the locking elements of the first group and the locking elements of the second group have the same angular spacings from each other, with respect to the lengthwise axis.

20. The sensor of claim 13, wherein the spring element includes spring element tongues formed on the spring element, the spring element tongues extending in the radial direction with respect to the lengthwise axis.

* * * * *

UNITED STATES PATENT AND TRADEMARK OFFICE
CERTIFICATE OF CORRECTION

| | | |
|---|---|---|
| PATENT NO. | : 8,177,179 B2 | Page 1 of 1 |
| APPLICATION NO. | : 12/273034 | |
| DATED | : May 15, 2012 | |
| INVENTOR(S) | : Bard et al. | |

It is certified that error appears in the above-identified patent and that said Letters Patent is hereby corrected as shown below:

In Col. 6, line 20, claim 16, delete "claim 13" and insert --claim 14--.
In Col. 6, line 24, claim 17, delete "claim 13" and insert --claim 14--.
In Col. 6, line 44, claim 20, delete "claim 13" and insert --claim 14--.

Signed and Sealed this
Fourteenth Day of August, 2012

David J. Kappos
*Director of the United States Patent and Trademark Office*